J. MARKMAN.
AUTOMOBILE LAMP.
APPLICATION FILED APR. 30, 1908.
901,921.
Patented Oct. 20, 1908.
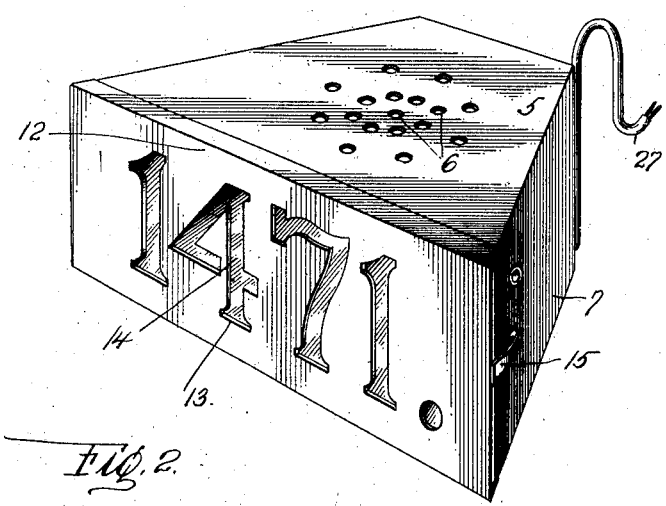
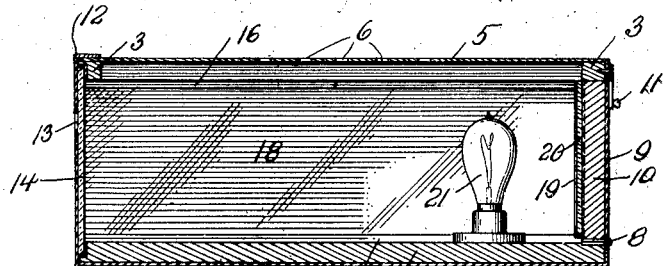
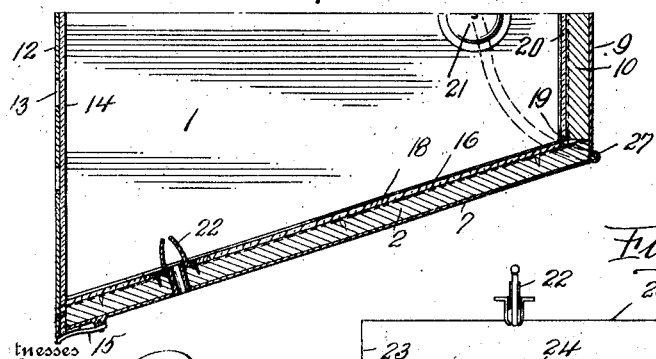
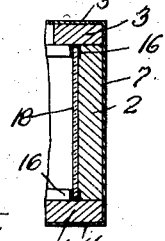
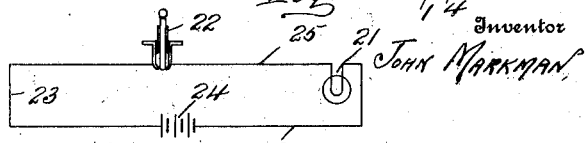
Inventor
JOHN MARKMAN

UNITED STATES PATENT OFFICE.

JOHN MARKMAN, OF PITTSBURG, PENNSYLVANIA.

AUTOMOBILE-LAMP.

No. 901,921.

Specification of Letters Patent.

Patented Oct. 20, 1908.

Application filed April 30, 1908. Serial No. 430,161.

*To all whom it may concern:*

Be it known that I, JOHN MARKMAN, a citizen of the United States of America, residing at Pittsburg, in the county of Allegheny and State of Pennsylvania, have invented certain new and useful Improvements in Automobile-Lamps, of which the following is a specification, reference being had therein to the accompanying drawing.

This invention relates to an automobile lamp particularly designed for displaying the registration or license number of an automobile, whereby the number can be readily observed of a night.

The object of my invention is to provide a novel lamp having reflectors for concentrating the rays of an incandescent bulb upon a plate provided with openings representing a number.

My invention aims to provide an automobile or similar vehicle with an illuminated registration or license number that will be visible a considerable distance, whereby said number can be easily detected by a policeman or watchman should an accident occur, such as the injuring of a pedestrian, and the operator of the automobile brought to account should the operator escape for the time being.

To this end, I have devised a lamp box that can be suitably carried by an automobile, the lamp box having a suitable electric lamp located therein, supplied by batteries carried by the automobile. A suitable switch is used in connection with the lamp box, and the box in its entirety is strong, durable, inexpensive and capable of withstanding the vibrations of an automobile when in operation.

The detail construction entering into my invention will be presently described and then specifically pointed out in the appended claim.

Referring to the drawings forming a part of this specification, Figure 1 is a perspective view of a lamp box constructed in accordance with my invention. Fig. 2 is a longitudinal sectional view of the same, Fig. 3 is a horizontal sectional view of approximately one-half the lamp box, Fig. 4 is a vertical cross sectional view of a portion of the same, and Fig. 5 is a diagrammatic view of the wiring of the box.

To put my invention into practice, I provide a base plate 1 with side walls 2, said walls having their upper edges connected at each end by transverse braces 3. The exterior surface of the base plate 1 is covered with a metallic plate 4, while the upper edges of the side walls 2 and the braces 3 support a metallic plate 5 having a plurality of ventilation openings 6 formed therein. The exterior sides of the walls 2 are covered with metallic plates 7 these plates preventing the lamp box from being injured. Hinged to the rear end of the base plate 1, as at 8 is a metallic plate 9 having a door 10 for closing the rear end of the lamp box, said door being maintained in a closed position by a pivoted latch 11 carried by the rear brace 3.

The front end of the metallic box is provided with a flanged metallic plate 12 having openings 13 formed therein representing numbers. One of the flanges of the plate 12 is cut away at the side of the box to permit of a transparent plate 14 being inserted in the lamp box to cover the openings 13, said transparent plate being seated in the front edges of the base plate 1 and the forward brace 3 and retained in position by a pivoted resilient latch 15 carried by one of the side walls 2.

The inner sides of the walls 2 are provided with guides 16 for detachable reflectors 18; said reflectors may be either in the form of a mirror or a polished metallic plate.

The door 10 is provided with vertical guides 19 for a reflector 20 similar to the reflectors 18. Upon the base plate 1 at the rear end of the lamp box and directly in front of the reflector 20 is located an incandescent lamp bulb 21, this bulb being supplied with electricity from a suitable source, preferably a battery located upon the automobile in connection with which the lamp box is used.

In order that the lighting of the bulb 21 can be easily controlled, I locate a conventional form of plug switch 22 in one of the side walls 2, this plug switch being connected by a wire 23 to a battery 24, by a wire 25 to the bulb 21, the circuit being completed by a wire 26 from the bulb 21 to the battery 24. When the plug is inserted in the switch 22 the lamp 21 will be illuminated, and it will be impossible for the operator of an automobile to quickly remove this plug, when the machine is in motion, and thus prevent the license number of the machine from being observed. The wires 23 and 26 are preferably carried in a tube 27 to the battery 24, whereby said wires cannot be tampered with or another switch cut in upon the wires.

I find that a four candle-power incandescent light can be economically and advantageously used; a polygonal casing insures the best results, and while I have illustrated it in the drawings the preferred form of construction, the elements therein may be varied within the scope of the appended claim or changed without departing from the scope of the invention.

Having now described my invention what I claim as new, is,—

In a device of the type described, a lamp box comprising a base and side walls secured thereto, guides carried by said side walls adjacent the upper and lower edges thereof, reflectors secured in said guides, braces connecting said side walls at the ends thereof, a transparent plate seated in the brace at the forward end of said box and in the said base, a sign-plate secured over said transparent plate, a perforated metallic top-plate for said box, a hinged door for the rear end of said box, and a reflector carried by the inner face of said door.

In testimony whereof I affix my signature in the presence of two witnesses.

JOHN MARKMAN.

Witnesses:
  Max H. Srolovitz,
  C. V. Brook.